Patented Dec. 8, 1931

1,835,821

UNITED STATES PATENT OFFICE

FRITZ STRAUB AND HANS MAYER, OF BASEL, AND WALTER HANHART, OF RIEHEN, NEAR BASEL, SWITZERLAND, ASSIGNORS TO THE FIRM SOCIETY OF CHEMICAL INDUSTRY IN BASLE, OF BASEL, SWITZERLAND

METALLIFEROUS DYESTUFFS AND PROCESS FOR THE MANUFACTURE OF SAME

No Drawing. Application filed June 5, 1930, Serial No. 459,412, and in Switzerland June 8, 1929.

The present invention relates to the manufacture of metalliferous dyestuffs. It comprises the process of making these dyestuffs, the dyestuffs themselves, and the material dyed with the new dyestuffs.

By the present invention valuable azo-dyestuffs containing metals are quite generally obtained by treating azo-dyestuffs, deriving from aromatic diazo-compounds and coupling components, which are derivatives of the naphthalene series containing nitrogen and which azo-dyestuffs contain lake forming groups, with agents yielding metals capable of forming lakes with the lake-forming group of the azo-dyestuffs.

The treatment of the dyestuffs with agents yielding metal may occur in an aqueous medium; in many cases, however, it is advantageous to carry it out in the presence of organic bases. As such are particularly suitable pyridine, its homologues and hydrogenation products, further also other water soluble or insoluble bases, such as quinoline, aniline, toluidine, benzylamine, amylamine, propylamine, ethanolamine, or the like.

The process of the invention proceeds easily and is suitable for sulfonated and non-sulfonated mono- and poly-azo-dyestuffs, which contain at least one hydroxyl-group or carboxyl-group in ortho-position to the $-N=N-$group, or contain a carboxyl-group in ortho-position to a hydroxyl-group.

The process is particularly applicable for making metal compounds of non-sulfonated ortho-hydroxy- or ortho-carboxy-azo-dyestuffs which are derived from α- and β-naphthylamine or their derivatives used as coupling components.

The complex metal compounds which can be made by the invention, can be used for dyeing materials of any kind, such as wool, loaded or unloaded silk, cotton, leather, artificial silk made from regenerated cellulose, cellulose esters or ethers, varnishes made from cellulose, or natural or artificial resins; they may also be used as pigments.

As agents which yield metal, there come into question compounds of metals, adapted to produce metallic complexes with the lake-forming group of the azo-dyestuff, for example those having atomic weights between 27 and 66, such as, for example Al, Cu, Zn, V, Cr, Mn, Fe, Co, Ni.

The treatment with the agent yielding metal may be conducted in presence of suitable additions, with or without application of pressure; also the manufacture of a dyestuff, such as the coupling operation, may be conducted in presence of an agent yielding a metal or metals the atomic weight of which is between 27 and 66.

The process can also be applied for making metalliferous azo-dyestuffs containing several metals, or metalliferous dyestuffs which are derived from several azo-dyestuffs.

The isolation of the dyestuffs containing metal may be done according to various methods; if the operation has been conducted in a medium containing organic bases, the dyestuff may be obtained, for example, by filtration of the reaction mixture and by distillation of the base. The metallizing agent in excess is removed by extraction of the evaporation residue with warm or hot water, whereby in many cases it is favorable to add to the water small quantities of alkali, inorganic or organic acid. Impurities which might be present can be removed by treatment with solvents in which the metallized dyestuffs are insoluble, such as, for instance, aqueous alcohol. If the metalliferous dyestuff is soluble in water, usual methods of isolation may be adopted.

The following examples illustrate the invention, the parts being by weight:—

Example 1

6.16 parts of the dyestuff of the formula

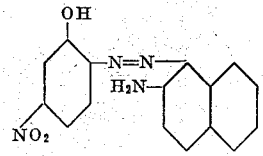

obtainable from diazotized 5-nitro-2-amino-1-phenol and β-naphthylamine are dissolved in 250 parts of pyridine and after addition of 8 parts of chromium formate the solution is heated to boiling for 20 hours in a reflux apparatus. The deep green pyridine solution is filtered hot and the solvent is distilled from the filtrate in a vacuum; the residue is then dried. The chromium compound free from sulfonic acid groups can be purified by treating the residue of the distillation with warm or hot water. The metal complex, which is insoluble in water, can be separated by filtration. Excess of the chromium salt or other salts may be separated by subsequent washing with warm or hot water.

The chromium compound produced is a green black powder, only very sparingly soluble in water or caustic soda solution. In concentrated sulfuric acid it dissolves to a blue violet solution and in organic solvents, such as alcohol, amylacetate or the like to a green solution. A solution of it in commercial nitrocellulose varnish yields on metal surfaces a yellowish green coating.

Example 2

5.26 parts of the dyestuff of the formula

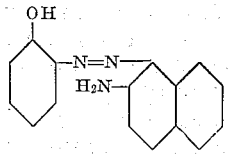

obtainable from diazotized 2-amino-1-phenol and β-naphthylamine are dissolved in 250 parts of pyridine, and, after addition of 9 parts of chromium acetate, the whole is heated to boiling for 20 hours in a reflux apparatus. The blue green solution is filtered and the chromium compound is isolated by addition of water to the filtrate and filtered. It is washed, and dried at a moderate temperature. It is a green-black powder, insoluble in water, only very sparingly soluble in caustic soda solution to a blue solution and soluble in concentrated sulfuric acid to a red violet solution. In organic solvents, such as alcohol, ethyl acetate, amyl acetate, or the like it dissolves to a blue green solution; so also in nitrocellulose varnish it dissolves and the solution yields blue green coatings on metal surfaces.

If chromium formate be substituted for chromium acetate a similar product is obtained.

Example 3

5.95 parts of the dyestuff of the formula

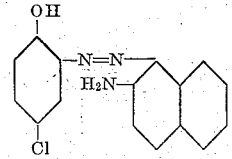

obtainable from diazotized 4-chloro-2-amino-1-phenol and β-naphthylamine are dissolved in 250 parts of chinoline, and after addition of 8 parts of chromium formate, the whole is heated to boiling for some hours in a reflux apparatus. As soon as the chroming is at an end, the deep bluish green solution is filtered from undissolved matter and the chinoline is distilled from it in a vacuum; the chromium compound which remains in the retort is dried at a moderate temperature. It is a green black powder insoluble or very sparingly soluble in water or caustic soda solution and soluble in concentrated sulfuric acid to a violet solution. Its blue green solution in nitrocellulose varnish yields blue green coatings on a metal surface.

For chromium formate chromium acetate may be substituted.

Instead of the dyestuff named above there may be used that from 4:6-dichloro-2-amino-1-phenol and β-naphthylamine, the operation being similar to that described; there is obtained a similar chromium compound which dissolves somewhat more sparingly in nitrocellulose varnish the solution giving bluish-green coatings.

Example 4

6.16 parts of the dyestuff of the formula

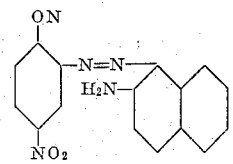

obtainable from diazotized 4-nitro-2-amino-1-phenol and β-naphthylamine are dissolved in 250 parts of pyridine and after addition of 7 parts of chromium formate the whole is boiled for several hours in a reflux apparatus, then filtered, the pyridine distilled from the filtrate in a vacuum and the residue from the distillation dried. The chromium compound is a green black powder, which is insoluble in water or caustic soda solution and dissolves in concentrated sulfuric acid to a violet solution. The dull green solution in nitrocellulose varnish yields on metal surfaces olive green coatings.

Example 5

3.42 parts of the dyestuff of the formula

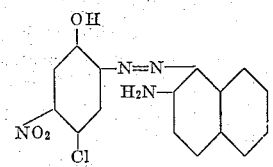

obtainable from diazotized 5-nitro-4-chloro-2-amino-1-phenol and β-naphthylamine are dissolved in 100 parts of pyridine and the solution is heated to boiling for several hours in a reflux apparatus with a quantity of chromium formate corresponding with 1.14 parts of $Cr_2O_3$. The deep blue-green solution is filtered from some chromium mud and the dyestuff isolated from the filtrate by distilling the solvent in a vacuum or in some other manner, such as by dilution with water, filtering and drying. The dry dyestuff is a black powder, insoluble in water, very sparingly soluble in caustic soda solution and soluble in concentrated sulfuric acid to a blue solution. In organic solvents it dissolves to a bluish green solution and nitro-cellulose varnishes or acetyl-cellulose varnishes in which it has been dissolved yield on metal surfaces bluish green coatings.

*Example 6*

3.53 parts of the dyestuff of the formula

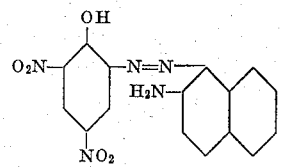

obtainable from diazotized picramic acid and β-naphthylamine, a quantity of chromium formate corresponding with 1.14 parts of $Cr_2O_3$ and 100 parts of pyridine are heated together to boiling in a reflux apparatus for several hours. When the chroming is complete, the undissolved matter is filtered, the pyridine is distilled in a vacuum and the residue is dried, whereby it becomes a green black powder, very sparingly soluble in water or caustic soda solution but soluble in concentrated sulfuric acid to a violet solution. Its yellow green solutions in acetyl-cellulose varnish give olive green coatings on metal surfaces.

*Example 7*

3.42 parts of the dyestuff of the formula

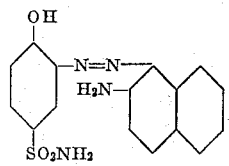

obtainable from diazotized 2-amino-1-phenol-4-sulfamide and β-naphthylamine are treated with chromium formate or acetate in pyridine solution in manner analogous to that described in the preceding examples. The chromium compound produced is a green black powder, very sparingly soluble in water and soluble in caustic soda solution to a blue solution and in concentrated sulfuric acid to a violet solution. It dyes acetyl-cellulose varnish bluish green.

The same process applied to the dyestuff from diazotized anthranilic acid and β-naphthylamine produces a chromium compound which dyes nitrocellulose varnishes or acetyl-cellulose varnishes red violet, while the chromium compound of the combination para-aminosalicylic acid + β-naphthylamine yields a brownish yellow lake which is sparingly soluble in nitrocellulose varnish but still easily soluble in acetyl-cellulose varnish.

*Example 8*

3.24 parts of the dyestuff of the formula

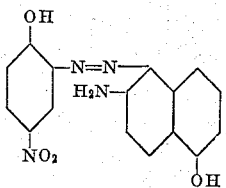

obtainable from diazotized 4-nitro-2-amino-1-phenol and 2:5-aminonaphthol combined in mineral acid solution, are dissoved in 100 parts of pyridine and the solution is heated to boiling for several hours in a reflux apparatus with a quantity of chromium formate corresponding with 1.14 parts of $Cr_2O_3$. The deep green solution is filtered, the pyridine is distilled in a vacuum and the residue of the distillation dried at a moderate temperature. The chromium compound produced is a black powder, insoluble in water but soluble in caustic soda solution to a green solution and in concentrated sulfuric acid to a reddish blue-grey solution. In organic solvents it dissolves to a green solution and its solution in nitro-cellulose varnish or acetyl-cellulose varnish yields yellowish green coatings on metal surfaces.

The combination 4-nitro-2-amino-1-phenol + 2:7-aminonaphthol (acid coupled) yields a chromium lake which is somewhat more bluish, that from 4-nitro-2-amino-1-phenol and 2:8-aminonaphthol, one which is a more olive tint. The latter is only slightly soluble in nitrocellulose varnish but more so in acetyl-cellulose varnish.

*Example 9*

3.24 parts of the dyestuff of the formula

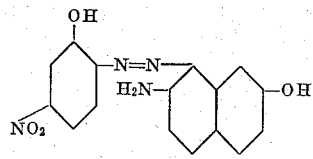

obtainable from diazotized 5-nitro-2-amino-1-phenol and 2:7-aminonaphthol (acid coupled) are converted in pyridine solution to the chromium compound by means of chromium formate and the product is isolated as described in one of the foregoing examples. When dry the new product is a blue-black powder, very sparingly soluble in water but soluble in caustic soda solution to a blue solution, which passes towards green when acidified, and in concentrated sulfuric acid to a blue solution. Its green solution in nitro-cellulose varnish or acetyl-cellulose varnish yields green coatings on a metal surface.

The chromium compound of the combination 5-nitro-2-amino-1-phenol + 2:5-aminonaphthol (acid coupled) yields a yellowish green, that with 2:8-aminonaphthol a blackish green. The last-named product is soluble in acetyl-cellulose varnish but not in nitro-cellulose varnish.

Instead of 2:5- or 2:8-aminonaphthol, the 2:6-aminonaphthol may be used as coupling component in the foregoing example.

Example 10

6.48 parts of the dyestuff of the formula

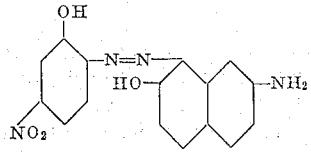

obtainable from diazotized 5-nitro-2-amino-1-phenol and 2:7-aminonaphthol (alkaline coupled) are dissolved in 250 parts of pyridine and the solution is heated to boiling for several hours in a reflux apparatus with 6 parts of chromium formate containing 39 per cent. of $Cr_2O_3$. The initially red solution gradually becomes deep blue. When the chroming is complete the chromium mud is filtered and the pyridine distilled in a vacuum. The dry residue from the distillation constituting the chromium compound is a dark blue powder, very sparingly soluble in water or caustic soda solution but soluble in concentrated sulfuric acid to a red violet solution. It dissolves in organic solvents to a blue solution and its solution in nitro-cellulose varnish or acetyl-cellulose varnish yields reddish blue coatings on metal surfaces.

From the combination 4-chloro-2-amino-1-phenol + 2:7-aminonaphthol (alkaline coupled) a violet dyeing chromium compound is obtained by the same method.

Example 11

6.27 parts of the dyestuff of the formula

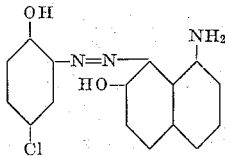

obtainable from diazotized 4-chloro-2-amino-1-phenol and 1:7 aminonaphthol (alkaline coupled) are converted into the corresponding chromium compound in manner analogous to that described in Example 10. The product is a black green powder, insoluble in water or caustic soda solution but soluble in concentrated sulfuric acid to a dull violet solution. In organic solution it dissolves somewhat sparingly to a greyish blue-green solution and the coatings obtained from nitro-cellulose varnish or acetyl-cellulose varnish containing it have the same tint.

Like products of blue grey to green grey tints are obtained in the same manner with the combinations (alkaline coupled) of 1:7-aminonaphthol with ortho-aminophenol, 4-chloro-2-amino-1-phenol or 4-nitro-2-amino-1-phenol.

Example 12

6.42 parts of the dyestuff of the formula

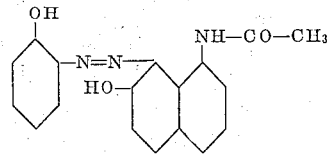

obtainable from ortho-aminophenol and 1-acetamino-7-naphthol (alkaline coupled) are dissolved in 200 parts of pyridine and the solution is heated to boiling for some hours in the reflux apparatus with 6 parts of chromium formate. The deep red blue solution is filtered from chromium mud and evaporated in a vacuum to dryness. The dark blue chromium compound thus obtained dissolves in water or caustic soda solution only very sparingly, in alcohol to a blue solution and in concentrated sulfuric acid to a violet solution. The coatings obtained on metal surfaces by means of its solution in nitro-cellulose varnish or acetyl-cellulose varnish are reddish blue.

If instead of ortho-aminophenol other diazo-components, such as 4-chloro-2-amino-1-phenol, 4-nitro-2-amino-1-phenol or 5-nitro-2-amino-1-phenol are used with the same coupling component, there are obtained similar greenish blue to greyish green blue dyeing chromium compounds.

By the same method there is obtained from the acid coupled dyestuff from diazotized anthranilic acid and 2:7-aminonaphthol a chromium compound, the solution of which in nitro-cellulose or acetyl-cellulose varnish yields brown red coatings.

Example 13

6.16 parts of the dyestuff of the formula

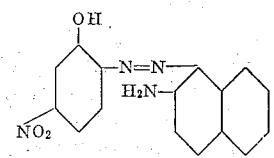

obtainable from diazotized 5-nitro-2-amino-1-phenol and β-naphthylamine are dissolved in 200 parts of pyridine and the solution is heated for some time to boiling with a quantity of ferric acetate corresponding with 1.12 parts of iron. The initially red solution rapidly becomes brownish violet. Some iron mud is filtered and from the filtrate the iron compound produced is precipitated by addition of water, or the pyridine is distilled in a vacuum and the residue dried at a moderate temperature. If the pyridine solution is allowed to remain for some time in the cold a portion of the dyestuff crystallizes. The dark olive iron compound dissolves in water or caustic soda solution very sparingly but in concentrated sulfuric acid it dissolves to a cornflower blue solution. In organic solvents it dissolve to a brownish-violet solution and its solutions in nitro-cellulose varnish or acetyl-cellulose varnish yield coatings of the same tint.

*Example 14*

5.95 parts of the dyestuff of the formula

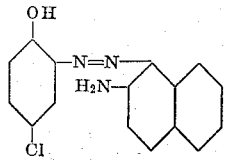

obtainable from diazotized 4-chloro-2-amino-1-phenol and β-naphthylamine are dissolved in 200 parts of pyridine and the solution is heated for some time to boiling with 5 parts of cobalt acetate. The reddish blue solution is filtered and the filtrate is evaporated in a vacuum to dryness. The cobalt compound remains in the form of a blue black powder which does not dissolve in water or caustic soda solution, but in concentrated sulfuric acid dissolves to a violet solution. It is well soluble in organic solvents and its solutions in nitro-cellulose varnish or acetyl-cellulose varnish yield blue-violet coatings on metal surfaces.

With nickel acetate instead of cobalt acetate there is obtained a brownish violet dyeing product and with manganese acetate an olive brown dyeing product.

*Example 15*

7.32 parts of the dyestuff of the formula

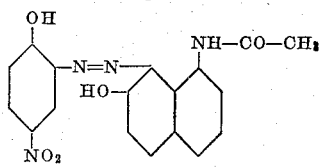

obtainable from diazotized 4-nitro-2-amino-1-phenol and 1-acetamino-7-naphthol (alkaline coupled) are converted in manner analogous to that described in the foregoing example in pyridine solution and by means of aluminium acetate into the corresponding aluminium compound. This is soluble in nitro-cellulose varnish or acetyl-cellulose varnish to violet solutions which yield coatings of the same tint on metal surfaces.

*Example 16*

15.6 parts of the sodium salt of the azo-dyestuff of the formula

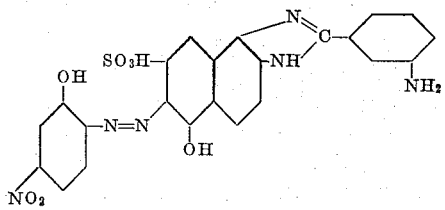

obtainable from imidazole acid of the formula

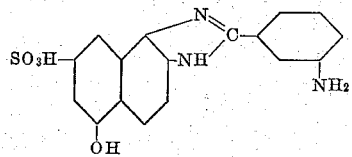

as described in German specification No. 167,139, and diazotized 5-nitro-2-amino-1-phenol are dissolved in 500 parts of pyridine and 10.8 parts of chromium formate (corresponding with 4.5 parts of $Cr_2O_3$) and the solution is boiled in a reflux apparatus until the chromium complex has been formed. The bulk of the solvent is then distilled and the dyestuff obtained from the remaining solution by introducing the latter into a solution of salt of 10 per cent. strength, to which dilute acetic acid has been added. After drying, there is obtained a violet powder of bronze lustre, which dissolves in water and caustic soda solution of 10 per cent. strength to a blue solution and in concentrated sulfuric acid to a violet solution, and dyes cotton and viscose uniform grey tints.

*Example 17*

6 parts of the sodium salt of the azo-dyestuff

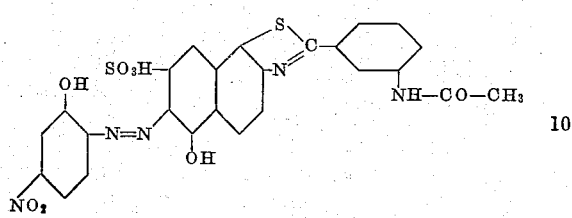

from diazotized 5-nitro-2-amino-1-phenol and the thiazole of the formula

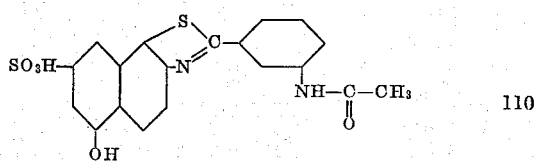

obtainable according to German specification No. 165,126 from 2-amino-5-hydroxynaphthalene-7-sulfonic acid, metanitrobenzaldehyde and alkalipolysulfides, which is advantageously acetylated, are dissolved in a mixture of 100 parts of pyridine and 100 parts of water, and after addition of 3.6 parts of chromium formate corresponding with 1.5 parts of $Cr_2O_3$, the solution is boiled in a reflux apparatus. The initially red color quickly passes to blue. The solution is filtered from impurities, a part of the solvent is distilled and then the dyestuff is precipitated by adding the residual solution to a salt solution of 10 per cent. strength. The desired product is obtained by filtering and drying. It dissolves in hot water and in caustic soda solution of 10 per cent. strength to a blue solution and in concentrated sulfuric acid to a violet solution. It dyes viscose and cotton uniform blue-grey tints of good properties of fastness.

*Example 18*

5.3 parts of the sodium salt of the azo-dyestuff of the formula

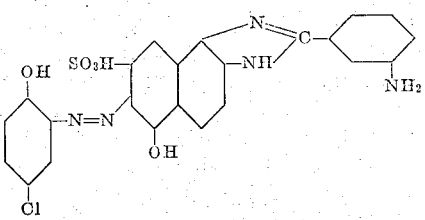

obtainable from diazotized chloroaminophenol and imidazole acid of the formula given in Example 16 are dissolved in 100 parts of pyridine and 100 parts of water, and after addition of an aqueous chromium fluoride solution corresponding with 1.5 parts of $Cr_2O_3$, the solution is boiled in a reflux apparatus until chroming is complete. The initially red solution becomes blue; it is filtered from impurities, a portion of the solvent is distilled and the residual solution is introduced into a salt solution of 10 per cent. strength, whereby the dyestuff is precipitated. It dissolves in water to a grey-blue solution, in dilute caustic soda solution and in concentrated sulfuric acid to a violet solution. It dyes viscose and cotton uniform violet tints.

What we claim is:—

1. A process for the manufacture of azo-dyestuffs containing metals, consisting in treating, in the presence of organic bases, azo-dyestuffs, obtainable by coupling diazo-compounds of the benzene series with nitrogen-containing coupling components of the naphthalene series the nitrogen of which is not linked to oxygen and which azo-dyestuffs contain lake forming groups, with agents yielding metals capable of forming lakes with the lake-forming groups of the azo-dyestuffs.

2. A process for the manufacture of non-sulfonated azo-dyestuffs containing metals, consisting in treating, in the presence of organic bases, non-sulfonated azo-dyestuffs obtainable by coupling non-sulfonated diazo-compounds of the benzene series with non-sulfonated nitrogen-containing coupling components of the naphthalene series the nitrogen of which is not linked to oxygen, and which non-sulfonated azo-dyestuffs contain lake forming groups, with agents yielding metals capable of forming lakes with the lake-forming groups of the non-sulfonated azo-dyestuffs.

3. A process for the manufacture of non-sulfonated azo-dyestuffs containing metals, consisting in treating, in the presence of heterocyclic organic bases, non-sulfonated azo-dyestuffs, obtainable by coupling non-sulfonated diazo-compounds of the benzene series with non-sulfonated nitrogen-containing coupling components of the naphthalene series the nitrogen of which is not linked to oxygen, and which non-sulfonated azo-dyestuffs contain lake forming groups, with agents yielding metals capable of forming lakes with the lake-forming groups of the non-sulfonated azo-dyestuffs.

4. A process for the manufacture of non-sulfonated azo-dyestuffs containing metals, consisting in treating, in the presence of heterocyclic organic bases, the heterocyclic atom of which is nitrogen, non-sulfonated azo-dyestuffs obtainable by coupling non-sulfonated diazo-compounds of the benzene series with non-sulfonated nitrogen-containing coupling components of the naphthalene series the nitrogen of which is not linked to oxygen, and which non-sulfonated azo-dyestuffs contain lake forming groups, with agents yielding metals capable of forming lakes with the lake-forming groups of the non-sulfonated azo-dyestuffs.

5. A process for the manufacture of non-sulfonated azo-dyestuffs containing metals, consisting in treating, in the presence of heterocyclic organic bases, the heterocyclic atom of which is nitrogen, non-sulfonated azo-dyestuffs obtainable by coupling non-sulfonated o-hydroxy-diazo-benzenes with non-sulfonated nitrogen-containing coupling components of the naphthalene series the nitrogen of which is not linked to oxygen, with agents yielding metals capable of forming lakes with the lake-forming groups of the non-sulfonated azo-dyestuffs.

6. A process for the manufacture of non-sulfonated azo-dyestuffs containing metals, consisting in treating, in the presence of heterocyclic organic bases, the heterocyclic atom of which is nitrogen, non-sulfonated azo-dyestuffs obtainable by coupling non-sulfonated o-hydroxy-diazo-benzenes with non-sulfonated naphthylamine compounds the nitrogen of which is not linked to oxygen, with agents yielding metals capable of forming lakes with the lake-forming groups of the non-sulfonated azo-dyestuffs.

7. A process for the manufacture of non-sulfonated azo-dyestuffs containing metals, consisting in treating in the presence of pyridine, non-sulfonated azo-dyestuffs obtainable by coupling non-sulfonated o-hydroxy-diazo-benzenes with non-sulfonated naphthylamines, with agents yielding metals capable of forming lakes with the lake-forming groups of the non-sulfonated azo-dyestuffs.

8. A process for the manufacture of non-sulfonated azo-dyestuffs containing metals, consisting in treating, in the presence of pyridine, non-sulfonated azo-dyestuffs obtainable by coupling non-sulfonated o-hydroxy-diazo-benzenes with non-sulfonated naphthylamines, with agents yielding metals of the atomic weight 27–66, capable of forming lakes with the lake forming groups of the non-sulfonated azo-dyestuffs.

9. A process for the manufacture of non-sulfonated azo-dyestuffs containing metals, consisting in treating, in the presence of pyridine, non-sulfonated azo-dyestuffs obtainable by coupling non-sulfonated o-hydroxy-diazo-benzenes with non-sulfonated naphthylamines, with agents yielding metals of the atomic weight 52–66.

10. A process for the manufacture of non-sulfonated azo-dyestuffs containing metals, consisting in treating, in the presence of pyridine, non-sulfonated azo-dyestuffs obtainable by coupling non-sulfonated o-hydroxy-diazo-benzenes with β-naphthylamine, with agents yielding metals of the atomic weight 52–56.

11. A process for the manufacture of non-sulfonated azo-dyestuffs, containing metals, consisting in treating, in the presence of pyridine, non-sulfonated azo-dyestuffs obtainable by coupling diazotized 5-nitro-2-amino-1-phenol and β-naphthylamine, with agents yielding metals of the atomic weight 52–56.

12. A process for the manufacture of a non-sulfonated azo-dyestuff containing metal, consisting in treating, in the presence of pyridine, the azo-dyestuff obtainable by coupling diazotized 5-nitro-2-amino-1-phenol and β-naphthylamine, with an agent yielding chromium.

13. As new products, the metal compounds of non-sulfonated azo-dyestuffs of the general formula R—N=N—R₁ wherein R stands for non-sulfonated radicles of the benzene series and R₁ for non-sulfonated nitrogen-containing naphthalene radicles the nitrogen of which is not linked to oxygen, and which dyestuffs contain complexly bound metals, which products form blue to green to black powders which are soluble in organic solvents with violet to blue to green coloration, in concentrated sulfuric acid to a red-violet to blue solution, and in the usual commercial pyroxyline varnishes to a violet to blue to green and olive-brown solution.

14. As new products, the metal compounds of non-sulfonated azo-dyestuffs of the general formula R—N=N—R₁ wherein R stands for a non-sulfonated radicle of the benzene series containing in ortho-position to the —N=N-bridge a hydroxyl-group, and wherein R₁ stands for a non-sulfonated nitrogen-containing naphthalene radicle the nitrogen of which is not linked to oxygen, and which dyestuffs contain complexly bound metals, which products form blue to green to black powders which are soluble in organic solvents with violet to blue to green coloration, in concentrated sulfuric acid to a red-violet to blue solution, and in the usual commercial pyroxyline varnishes to a violet to blue to green and olive-brown solution.

15. As new products, the metal compounds of non-sulfonated azo-dyestuffs of the general formula

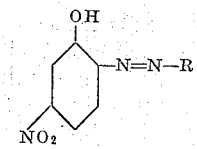

in which R stands for a non-sulfonated naphthylamine radicle the nitrogen of which is not linked to oxygen, and which dyestuffs contain complexly bound metals, which products form blue to green to black powders which are soluble in organic solvents with violet to blue to green coloration, in concentrated sulfuric acid to a red–violet to blue solution, and in the usual commercial pyroxyline varnishes to a violet to blue to green and olive-brown solution.

16. As new products, the metal compounds of non-sulfonated azo-dyestuffs of the general formula

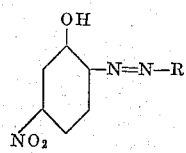

in which R stands for a non-sulfonated naphthylamine, and which dyestuffs contain complexly bound metals of the atomic weight 27–66, which products form blue to green to black powders which are soluble in organic slovents with violet to blue to green coloration, in concentrated sulfuric acid to a red-violet to blue solution, and in the usual commercial pyroxyline varnishes to a violet to blue to green and olive-brown solution.

17. As new products, the metal compounds of non-sulfonated azo-dyestuffs of the general formula

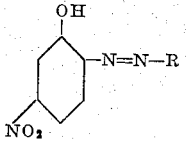

in which R stands for a non-sulfonated naphthylamine, and which dyestuffs contain complexly bound metals of the atomic weight 52–66, which products form blue to green to black powders which are soluble in organic solvents with violet to blue to green coloration, in concentrated sulfuric acid to a red-violet to blue solution, and in the usual commercial pyroxyline varnishes to a violet to blue to green and olive-brown solution.

18. As a new product, the metal compound of the non-sulfonated azo-dyestuff of the formula

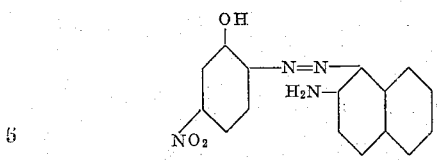

which dyestuff contains complexly bound chromium, which product forms a greenish-black powder, which is soluble in alcohol with green, in concentrated sulfuric acid with bluish-violet and in the usual commercial pyroxyline varnishes with yellow green color.

In witness whereof we have hereunto signed our names this 26th day of May 1930.

FRITZ STRAUB.
HANS MAYER.
WALTER HANHART.